No. 816,362. PATENTED MAR. 27, 1906.
W. A. NYSWONGER.
HOE.
APPLICATION FILED JULY 26, 1905.
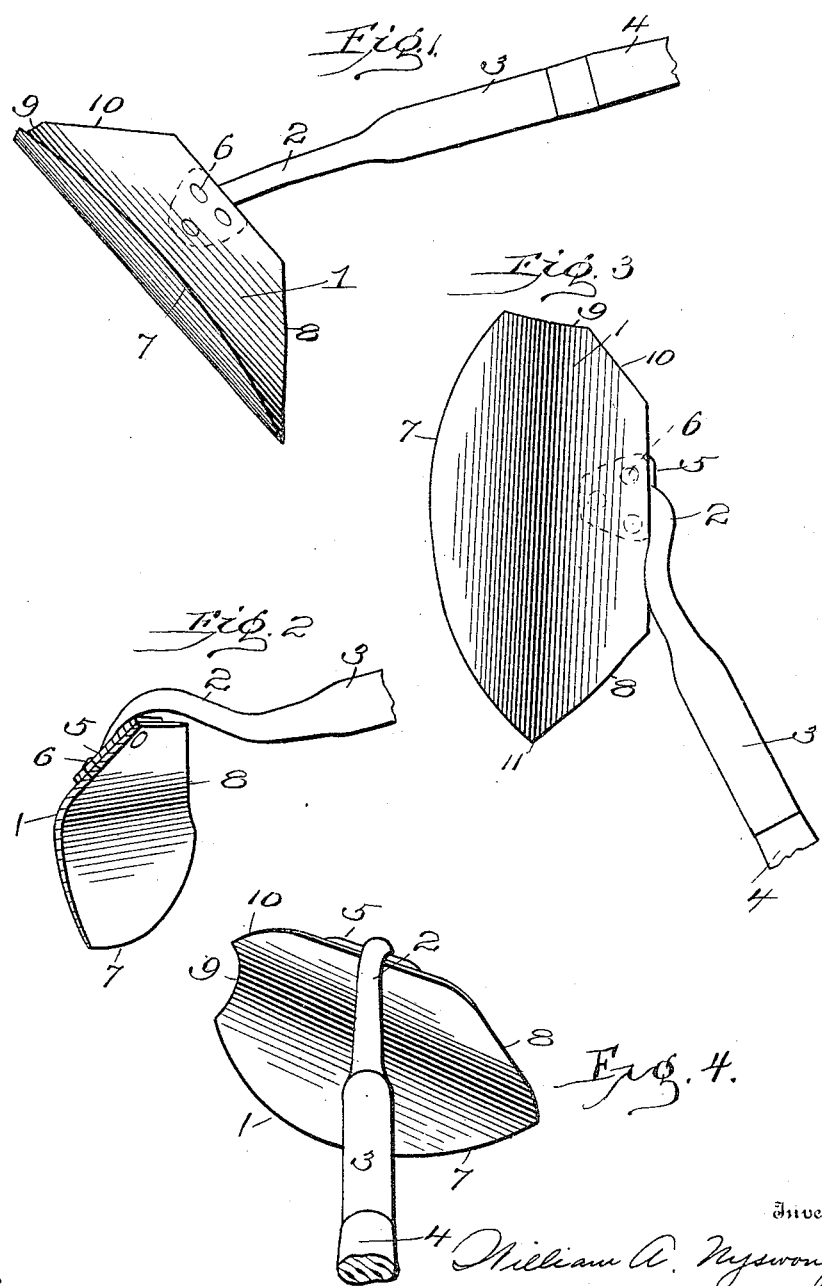
Witnesses
J. M. Fowler Jr
E. E. Vrooman.
Inventor
William A. Nyswonger,
By Mason, Fenwick & Lawrence
Attorneys

UNITED STATES PATENT OFFICE.

WILLIAM A. NYSWONGER, OF MONTROSE, COLORADO.

HOE.

No. 816,362.      Specification of Letters Patent.      Patented March 27, 1906.

Application filed July 26, 1905. Serial No. 271,381.

*To all whom it may concern:*

Be it known that I, WILLIAM A. NYSWONGER, a citizen of the United States, residing at Montrose, in the county of Montrose and State of Colorado, have invented certain new and useful Improvements in Hoes; and I do hereby declare the following to be a full, clear, and exact description of the invention, such as will enable others skilled in the art to which it appertains to make and use the same.

This invention relates to new and useful improvements in hoes, and particularly to an angle-hoe.

One of the several objects of the invention is the peculiar positioning of the blade of the hoe at an angle to the ferrule and handle.

Another object of the invention is the production of an implement which is constructed of members making the same susceptible to be employed for different purposes as an agricultural implement.

A further object of the invention is the peculiar construction of a hoe which is capable of being employed for different purposes—as, for instance, a hoe, a trowel, or a weed or grass cutting implement.

With these and other objects in view the invention consists of certain other novel constructions, combinations, and arrangements of parts, as will be hereinafter fully described, illustrated in the accompanying drawings, and more particularly pointed out in the claims hereto appended.

In the drawings, Figure 1 is a front view of an implement constructed in accordance with the present invention, showing a portion of the handle engaging the ferrule. Fig. 2 is a fragmentary vertical sectional view of the implement or hoe. Fig. 3 is a view of the inner face of the blade of the hoe, the hoe being at substantially right angles to the position of the same depicted in Fig. 1. Fig. 4 is a top plan view of the implement or hoe.

Referring to the drawings by numerals, 1 designates a many-sided blade, preferably concavo-convexed, which is fixedly secured to an angular shank 2. The shank 2 is formed integral with a ferrule 3. The handle 4 is positioned within the ferrule 3. The shank 2 is curved upwardly, Fig. 2, and outwardly, Figs. 3 and 4, thereby placing the flattened integral portion 5 at an oblique angle to the ferrule 3. Suitable fastening means, as rivets 6, are employed for attaching the many-sided curved blade 1 to the flat portion 5 of the shank 2.

The curved blade 1 is provided with a main or primary cutting edge 7 and with a substantially straight auxiliary cutting edge 8. The auxiliary cutting edge 8 is formed upon one end of the blade 1. Upon the opposite end of the blade 1 there is formed a curved cutting edge 9 and a substantially straight cutting edge 10. The curved edge 9 and the straight cutting edge 10 constitute an angular cutting edge formed upon one end of the blade 1.

For the purpose of better understanding the different uses to which this implement or hoe is applied I will in the following description point out specifically the advantages obtained by the peculiar structure of the cutting edges of the blade 1. By reason of the fact that the hoe is constructed so as to cut with a side draft it enables one to cut the largest weeds with very little exertion. It is admirably adapted for irrigation purposes, being a fine implement to make or clean a small furrow. It will be noted that the end 11 of the hoe or implement which is formed by the cutting edge 8 and a portion of the main cutting edge 7 constitutes a substantially V-shaped portion, by reason of which the implement may be employed for purposes similar to that for which a trowel is used. By turning the hoe or implement so as to place the cutting edge 8 upon the ground said hoe can be used to cut weeds away from the sides of plants so close as to practically obviate the necessity of pulling the weeds with the fingers. Another feature of the peculiar structure of my blade and by which I produce an implement which is provided with cutting edges of great utility is that the blade has not any square corners. The curved cutting edge 9 constitutes a notch, which permits of the hoe or implement to be used for pushing weeds from between plants, which would ordinarily have to be pulled with the fingers. This curved edge 9 is used by turning the hoe so that the notch is pointing to the ground, and then said hoe is drawn over, or, in other words, is positioned between the plant and the weed, and then by a slight push or drawing of the hoe the weed would be extracted or removed from the plant without injury thereto. By reason of the pointed structure of that portion of the blade 1 which constitutes a trowel the implement or hoe may be employed as a marker. While the implement is susceptible of these different uses, it is also admirably adapted for the same use as an ordinary hoe, only it is a far superior implement, as the angle of the blade to the handle produces a substantially side draft as the hoe is drawn toward the operator, thereby reducing the amount of labor necessarily employed as when using an ordinary device.

What I claim is—

1. An implement of the class described, comprising a shank provided with an integral, flat portion of greater width than said shank, a concavo-convex blade secured intermediate its length to the flat portion of said shank, said blade provided with a curved cutting edge extending its entire length, a curved and a straight cutting edge formed upon one end of said blade and a straight cutting edge formed upon the opposite end.

2. An implement of the class described, comprising a handle, an upwardly and outwardly curved shank provided with a ferrule, carried by said handle, said shank provided with an integral flat portion, and a concavo-convexed blade fixedly secured to the flat portion of said shank, said blade positioned at an oblique angle to said handle, said blade provided with a main cutting edge of substantially the same length as said blade and with a substantially straight, auxiliary cutting edge, said main and auxiliary cutting edges constituting a trowel structure, and said blade provided at one end with a curved cutting edge.

In testimony whereof I affix my signature in presence of two witnesses.

WILLIAM A. NYSWONGER.

Witnesses:
E. E. CUMMING,
JOHN C. BELL.